(12) United States Patent
Li (10) Patent No.: US 12,133,203 B2
(45) Date of Patent: Oct. 29, 2024

(54) METHOD AND DEVICE FOR INFORMATION CONFIGURATION, METHOD AND DEVICE FOR CHANNEL ESTIMATION, AND TRANSMITTING DEVICE

(71) Applicant: BEIJING XIAOMI MOBILE SOFTWARE CO., LTD., Beijing (CN)

(72) Inventor: Yuanyuan Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 352 days.

(21) Appl. No.: 17/631,436

(22) PCT Filed: Jul. 30, 2019

(86) PCT No.: PCT/CN2019/098353
§ 371 (c)(1),
(2) Date: Jan. 28, 2022

(87) PCT Pub. No.: WO2021/016853
PCT Pub. Date: Feb. 4, 2021

(65) Prior Publication Data
US 2022/0279495 A1 Sep. 1, 2022

(51) Int. Cl.
*H04W 72/04* (2023.01)
*H04L 25/02* (2006.01)
(Continued)

(52) U.S. Cl.
CPC ....... *H04W 72/044* (2013.01); *H04L 25/0202* (2013.01)

(58) Field of Classification Search
None
See application file for complete search history.

(56) References Cited

U.S. PATENT DOCUMENTS 10,218,481 B2 * 2/2019 Lee .................. H04L 5/0053
2013/0010723 A1 * 1/2013 Ouchi .............. H04W 52/346
370/329
(Continued)

FOREIGN PATENT DOCUMENTS

| CN | 102025459 A | 4/2011 |
|----|-------------|--------|
| CN | 105827383 A | 8/2016 |

(Continued)

OTHER PUBLICATIONS

International Search Report of PCT/CN2019/098353 dated Apr. 24, 2020 with English translation, (4p).
(Continued)

*Primary Examiner* — Sai Aung
(74) *Attorney, Agent, or Firm* — Arch & Lake LLP; Zhangyuan Jii; Hao Tan (57) ABSTRACT

The present disclosure relates to a method and device for information configuration, a method and device for channel estimation method, a transmitting device and a receiving device. The method for information configuration includes: configuring no pilot on a physical resource transmitted on a first time-frequency unit; determining a transmission capability of the physical resource configured without a pilot, and performing rate matching based on the transmission capability.

17 Claims, 8 Drawing Sheets

(51) Int. Cl.
*H04W 72/00* (2023.01)
*H04W 72/044* (2023.01)

(56) References Cited

U.S. PATENT DOCUMENTS

| | | | | |
|---|---|---|---|---|
| 2016/0119095 A1* | 4/2016 | Lee | .................. | H04L 5/0073 370/329 |
| 2016/0127095 A1* | 5/2016 | Chen | .................. | H04L 5/0048 370/329 |
| 2016/0242054 A1* | 8/2016 | Lee | .................. | H04B 17/345 |
| 2016/0270039 A1* | 9/2016 | Abe | .................. | H04L 5/0053 |
| 2020/0213989 A1* | 7/2020 | Choi | .................. | H04L 5/0053 |
| 2020/0374883 A1* | 11/2020 | Chen | .................. | H04W 76/27 |
| 2021/0234656 A1* | 7/2021 | Matsumura | ............ | H04L 5/001 |

FOREIGN PATENT DOCUMENTS

| | | |
|---|---|---|
| CN | 109075955 A | 12/2018 |
| CN | 109565433 A | 4/2019 |
| WO | 2018175528 A1 | 9/2018 |
| WO | 2019099535 A1 | 5/2019 |

OTHER PUBLICATIONS

LG Electronics, "Discussion on physical layer structure for NR sidelink", 3GPP TSG RAN WG1 #97, May 17, 2019, (xp).
Office Action issued to Chinese Application No. 201980001592.X dated Feb. 28, 2022 with English translation, (14p).

* cited by examiner

METHOD AND DEVICE FOR INFORMATION CONFIGURATION, METHOD AND DEVICE FOR CHANNEL ESTIMATION, AND TRANSMITTING DEVICE

CROSS-REFERENCE TO RELATED APPLICATION

This application is a U.S. national stage of International Application No. PCT/CN2019/098353, filed on Jul. 30, 2019, the disclosure of which is hereby incorporated by reference in its entirety for all purposes.

TECHNICAL FIELD

The present disclosure relates to the field of communication technology, and in particular to an information configuration method and information configuration device, a channel estimation method and channel estimation device, a transmitting device and a receiving device.

BACKGROUND

Vehicle-to-Everything (hereinafter referred to as V2X) is a new generation of information and communication technology through which a vehicle is connected with everything. V stands for vehicles and X stands for any object that interacts with vehicles. Currently, X mainly includes vehicles, People, traffic roadside infrastructure and networks. The information interaction modes of V2X include: interaction of Vehicle to Vehicle (V2V for short), Vehicle to Infrastructure (V21 for short), Vehicle to Pedestrian (V2P for short), Vehicle to Network (V2N for short). Cellular Vehicle-to-Everything (C-V2X for short) refers to V2X developed based on the evolution of cellular network communication technologies such as the fourth generation (4G) mobile communication technology or the fifth generation (5G) mobile communication technology. C-V2X contains two types of communication interfaces: one of them is a proximity direct communication interface (PC5) between vehicles, people, and infrastructures, and the other of them is a cellular communication interface (Uu) capable of implementing reliable long-distance and larger-range communication.

Transportation participation elements such as people, vehicles, infrastructures, and clouds are organically linked together through V2X. Accordingly, V2X supports the vehicle to obtain more information than that perceived itself, and promotes the innovation and application of autonomous driving technology. Further, V2X is also conducive to building a smart transportation system and promoting the development of new models of automobiles and transportation services, which is of great significance to improve transportation efficiency, save resources, reduce pollution, reduce accident rates, and improve traffic management.

Key technologies of C-V2X are improved in terms of core performance based on Long Term Evolution (LTE). For the PC5 interface, the physical layer structure is enhanced to support higher speed, global satellite navigation system synchronization and more efficient resource allocation mechanisms as well as congestion control mechanisms are supported. For the Uu interface, uplink transmission and downlink transmission are enhanced, and mobile edge computing capability is taken into account.

The standardization of C-V2X can be divided into three stages. The R14 version standard of LTE-V2X mainly includes four aspects: business requirements, system architecture, air interface technology, and security research. LTE-eV2X refers to an enhanced technology research phase (R15) that supports V2X advanced business scenarios, and the goal of LTE-eV2X is to further improve the reliability, data rate and delay performance of the V2X direct communication mode to partially meet the needs of V2X advanced business. The 5G-V2X phase refers to the technical research phase (R16+) based on the 5G New Radio (NR), and is used to support the advanced business scenarios of V2X. The research of 5G-V2X is initiated at June, 2018, and 5G-V2X forms a complementary relationship with the LTE-V2X or LTE-eV2X.

SUMMARY

In view of this, the present application provides an information configuration method and information configuration device, a channel estimation method and channel estimation device, a transmitting device and a receiving device.

A first aspect of the present disclosure provides an information configuration method, which is applied to a transmitting end and includes: configuring no pilot on a physical resource transmitted on a first time-frequency unit; and determining a transmission capability of the physical resource for which no pilot is configured, and performing rate matching based on the transmission capability.

A second aspect of the present disclosure provides a channel estimation method, which is applied to a receiving end and includes: acquiring time-frequency position of a channel, for which no pilot is configured, in first time-frequency unit; and calculating, based on the time-frequency location, a channel estimation value for the channel.

A third aspect of the present disclosure provides an information configuration device including a processor; and a memory for storing instructions executable by the processor, the processor is arranged to execute operations of: configuring no pilot on a physical resource transmitted on a first time-frequency unit; determining a transmission capability of the physical resource for which no pilot is configured, and performing rate matching based on the transmission capability.

It should be understood that the above general description and detailed description described below are only exemplary and explanatory, and not intended to limit the present disclosure.

BRIEF DESCRIPTION OF THE DRAWINGS

The drawings herein are incorporated into the specification and constitute a part of the specification, show embodiments that conform to the disclosure, and are used to explain the principle of the disclosure in conjunction with the specification.

DETAILED DESCRIPTION

The exemplary embodiments shown in the accompanying drawings will be described in detail here. When the following description refers to the drawings, unless otherwise indicated, the same numbers in different drawings indicate the same or similar elements. The implementation manners described in the following exemplary embodiments do not represent all implementation manners consistent with the present disclosure. On the contrary, they are merely examples of devices and methods consistent with some aspects of the present disclosure as recited in the appended claims.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

It should be understood that although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to . . . , it is determined that".

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

Different from LTE-V2X, NR V2X not only supports broadcast transmission, but also supports unicast and multicast transmission, that is, transmission is only for one or several target users. Therefore, in different transmission scenarios, the size of data transmitted through Physical Sidelink Control CHannel (PSCCH) will be quite different. In order to prevent user equipment (UE) from performing excessive blind detection and reduce perception complexity of UE, a 2-stage PSCCH method is currently proposed, that is, the PSCCH is divided into two parts. Data that all user equipment needs to receive is transmitted on the first part, and data that only specific user equipment needs to receive is transmitted on the second part, and the two parts are encoded and transmitted independently.

At present, transmissions of the two parts (2 stage) tend to have the same number of bits, but the performance of each part of 2-stage transmission is lower than that of 1-stage transmission.

Figure 1:
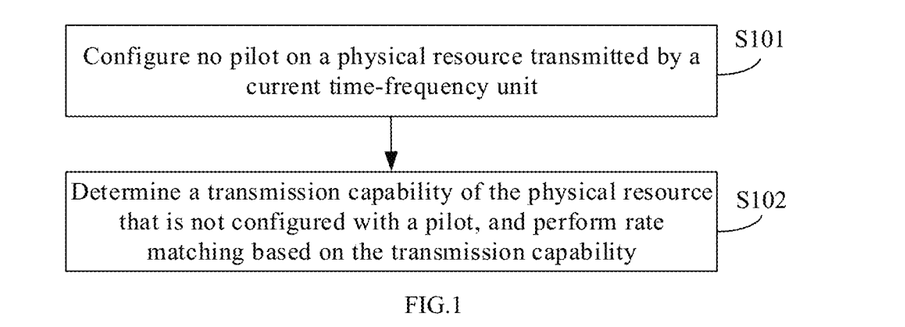
FIG. 1 is a flowchart of an information configuration method according to one or more examples of the present application.

FIG. 1 is a flowchart of an information configuration method according to an exemplary embodiment of the present application. This embodiment is described from the point of view of a transmitting end. As shown in FIG. 1, the information configuration method includes steps described below.

In step S101, no pilot is configured on a physical resource transmitted on a first time-frequency unit.

The time-frequency unit refers to a time domain unit and a frequency domain unit, and the time domain unit may include, but is not limited to, a time slot, a sub-frame, and the like.

Configuring no pilot on the physical resource transmitted on the first time-frequency unit may include, but is not limited to, any case described below.

In case 11, no pilot is configured on a physical resource transmitted on a second part of the PSCCH in the first time-frequency unit.

In the present embodiment, configuring no pilot on the physical resource transmitted on the second part of the PSCCH in the first time-frequency unit may include, but is not limited to, the following manner:

In manner 11, time-frequency position of the physical resource transmitted on the second part of the PSCCH in the first time-frequency unit is acquired, and the second part of the PSCCH is mapped at the time-frequency position.

In such embodiment, the time-frequency position of the physical resource transmitted on the second part of the PSCCH in the first time-frequency unit can be acquired through high-layer signaling, or the time-frequency position of the physical resource transmitted on the second part of the PSCCH in the first time-frequency unit can be acquired by analyzing a first part of the PSCCH in the first time-frequency unit.

In manner 12, the second part of the PSCCH is mapped according to time-frequency position of a pilot of PSSCH in the first time-frequency unit.

In such embodiment, the second part of the PSCCH may be mapped to a time-frequency unit within a preset range of the time-frequency unit where the pilot of the PSSCH is located.

Figure 2A:
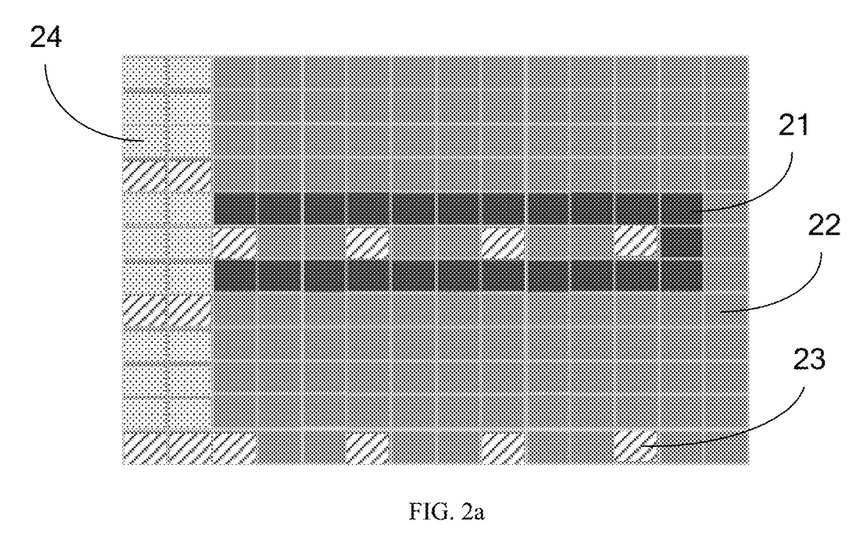
FIG. 2a is a schematic diagram I illustrating mapping a second part of PSCCH according to one or more examples of the present application.

As shown in FIG. 2a, the second part 21 of the PSCCH can be mapped to a time-frequency unit near the time-frequency unit where the pilot 23 of the PSSCH 22 is located. A first part 24 of the PSCCH is also shown in FIG. 2a.

It should be noted that FIG. 2a is only a schematic diagram, where pilot density of the data part, that is, the pilot 23 of the PSSCH 22, can be encrypted or remain unchanged, according to the performance requirements of the second part, at the position where the second part appears.

Figure 2B:
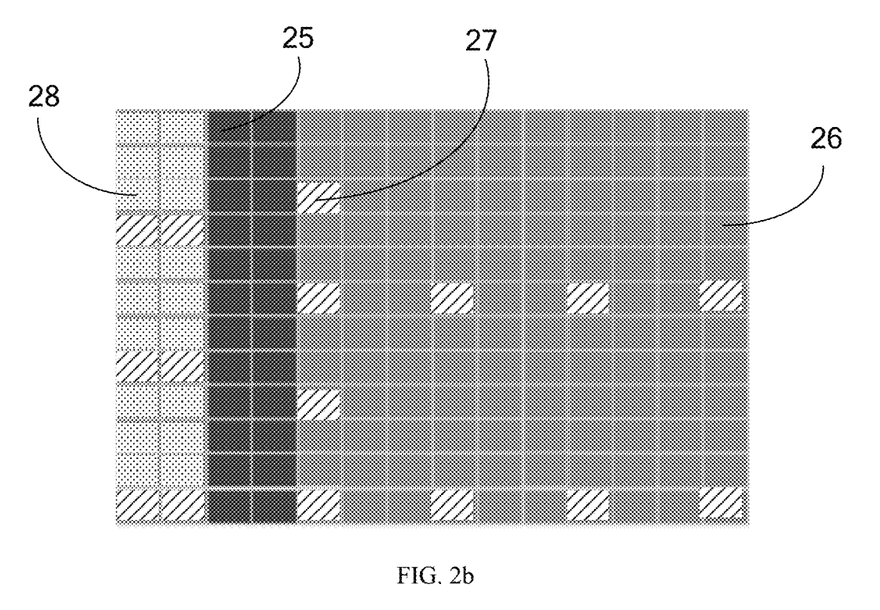
FIG. 2b is a schematic diagram II illustrating mapping a second part of PSCCH according to one or more examples of the present application.

In this embodiment, the second part of the PSCCH may also be mapped so that a first pilot of the PSSCH is adjacent to the second part of the PSCCH in the time-frequency domain.

As shown in FIG. 2b, the second part 25 of the PSCCH may be mapped such that the first pilot 27 of the PSSCH 26 is adjacent to the second part 25 of the PSCCH in the time-frequency domain. The first part 28 of the PSCCH is also shown in FIG. 2b.

It should be noted that FIG. 2b is only a schematic diagram, where pilot density of the data part, that is, the pilot 27 of the PSSCH 2, can be encrypted or remain unchanged, according to the performance requirements of the second part, at the position where the second part appears.

In the present embodiment, no pilot is configured, through various mapping manners, on the physical resources transmitted on the second part of the PSCCH in the first time-frequency unit, and the implementations are simple and diverse.

In the present embodiment, by configuring no pilot on the physical resources transmitted on the second part of the PSCCH, the transmission resource of the second part in enhanced, thereby improving the transmission performance of the second part.

In case 12, no pilot is configured on a physical resource transmitted on the PSCCH in the first time-frequency unit.

In this embodiment, no pilot is configured on physical resources transmitted by the first part and the second part of the PSCCH in the first time-frequency unit.

In case 13, no pilot is configured on physical resources transmitted on the PSCCH and the Physical SideLink Shared Channel (PSSCH) in the first time-frequency unit.

In this embodiment, no pilot is configured on the physical resources transmitted by the PSSCH as well as the first part and the second part of the PSCCH in the first time-frequency unit.

In some embodiments, the method may further include: agreeing on configuration information of a corresponding physical resource through protocols, or transmitting configuration information of a corresponding physical resource to a receiving end, so as to facilitate the receiving end to obtain the position of the second part of the PSCCH channel according to the configuration information.

In step S102, transmission capability of the physical resource, for which no pilot is configured, is determined, and rate matching is performed based on the transmission capability.

After no pilot is configured on the physical resource transmitted on the first time-frequency unit, the transmission capability of the physical resource is determined, and rate matching is performed based on the transmission capability.

In the embodiment described above, no pilot is configured on the physical resource transmitted on the first time-frequency unit so as to improve the transmission resource of the physical resource, and further to improve the transmission performance of the physical resource.

Figure 3:
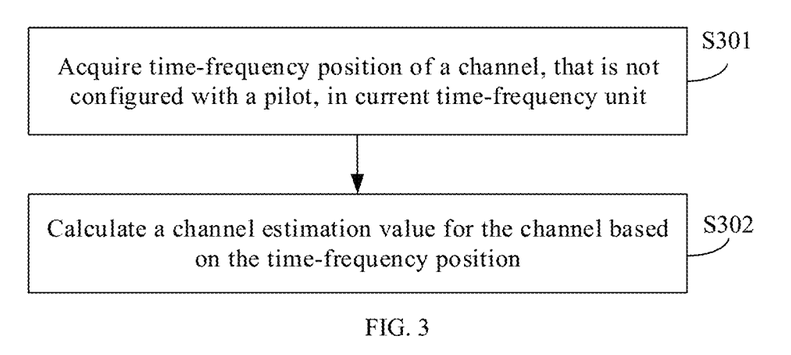
FIG. 3 is a flowchart of a channel estimation method according to one or more examples of the present application.

FIG. 3 is a flowchart of a channel estimation method according to an exemplary embodiment of the present application. The embodiment is described from the point of view of the receiving end. As shown in FIG. 3, the method includes steps described below.

In step S301, time-frequency position of a channel, in which no pilot is configured, in first time-frequency unit is obtained.

In step S302, a channel estimation value of the channel is calculated based on the time-frequency position.

In the present embodiment, if the channel for which no pilot is configured is the second part of the PSCCH, then the time-frequency position of the second part of the PSCCH in the first time-frequency unit can be acquired, and the channel estimation value for the second part of the PSCCH is calculated based on the time-frequency position of the second part of the PSCCH.

The step, in which the channel estimation value for the second part of the PSCCH is calculated based on the time-frequency position of the second part of the PSCCH, may include: calculating the channel estimation value for the second part of the PSCCH based on the time-frequency position of the second part of the PSCCH and a pilot of a first part of the PSCCH. The channel estimation value for the second part of the PSCCH may also be calculated based on the time-frequency position of the second part of the PSCCH and a pilot of a traffic channel.

In this embodiment, the manner of acquiring the time-frequency position of the second part of the PSCCH may include: acquiring the time-frequency position of the second part of the PSCCH according to the configuration information of the physical resource corresponding to the second part of the PSCCH. The manner of acquiring the time-frequency position of the second part of the PSCCH may also include: acquiring the time-frequency position of the second part of the PSCCH according to the position of the pilot of the PSSCH.

In some embodiments, the method may further include: agreeing on the configuration information of the corresponding physical resource through protocols, or receiving the configuration information of the corresponding physical resource from the transmitting end, so as to obtain the time-frequency position of the second part of the PSCCH according to the configuration information.

In this embodiment, if the channels for which no pilot is configured are the PSCCH and PSSCH in the first time-frequency unit, then the time-frequency position of the PSCCH and the time-frequency position of the PSSCH in the first time-frequency unit can be acquired, and the channel estimation value for the first time-frequency unit is calculated according to the time-frequency position of the PSCCH and the time-frequency position of the PSSCH in the first time-frequency unit, as well as a pilot of the previous time-frequency unit.

In this embodiment, if the channel for which no pilot is configured is the first part and the second part of the PSCCH in the first time-frequency unit, then the time-frequency positions of the first part and the second part of the PSCCH in the first time-frequency unit can be acquired, and the channel estimation value for the first time-frequency unit is calculated according to the time-frequency positions of the first part and the second part of the PSCCH in the first time-frequency unit and the pilot of the previous time-frequency unit.

In the embodiment described above, the method is implemented in a simple manner by acquiring the time-frequency position of the channel, for which no pilot is configured, in the first time-frequency unit, and calculating the channel estimation value for the channel based on the time-frequency position.

Figure 4:
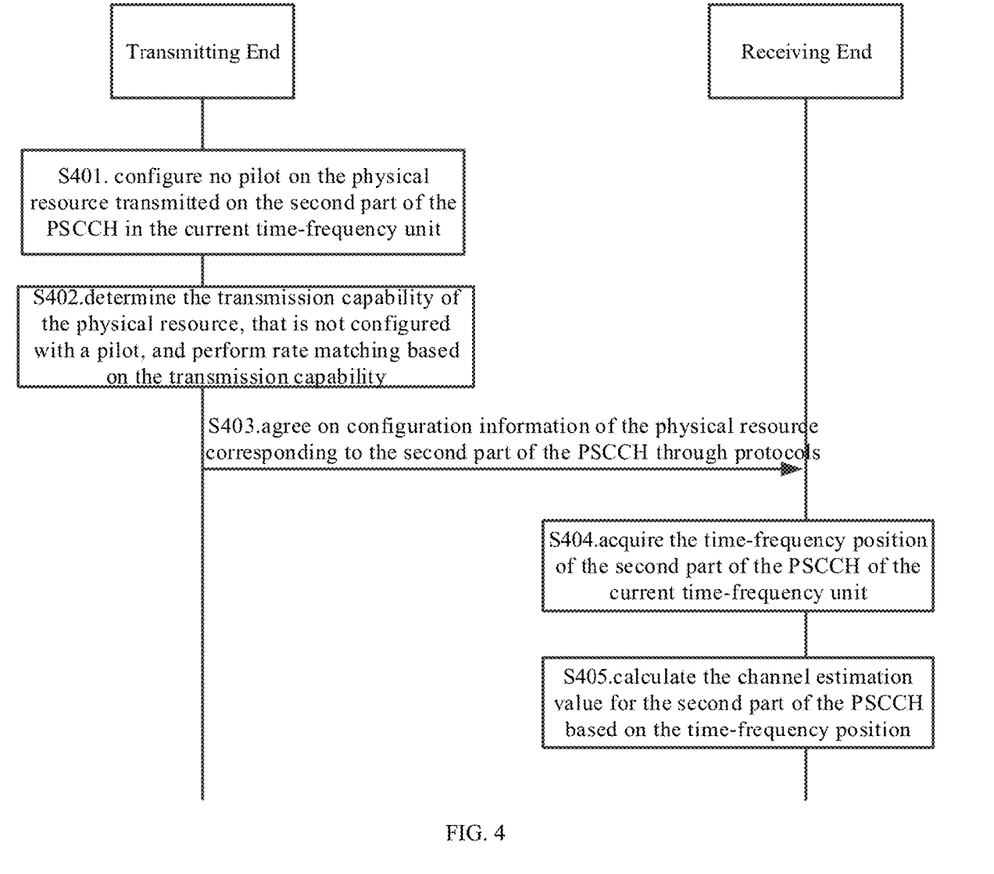
FIG. 4 is a signaling flowchart of a channel estimation method according to one or more examples of the present application.

FIG. 4 is a signaling flow chart of a channel estimation method shown in an exemplary embodiment of the present application. This embodiment is described from the perspective of interaction between a transmitting end and a receiving end. As shown in FIG. 4, the method includes steps described below.

In step S401, the transmitting end configures no pilot on a physical resource transmitted on a second part of the PSCCH in a first time-frequency unit.

In step S402, the transmitting end determines a transmission capability of the physical resource, for which no pilot is configured, and performs rate matching based on the transmission capability.

In step S403, the transmitting end and the receiving end agree on configuration information of the physical resource corresponding to the second part of the PSCCH through protocols.

In step S404, the receiving end acquires the time-frequency position of the second part of the PSCCH in the first time-frequency unit.

In step S405, the receiving end calculates the channel estimation value for the second part of the PSCCH based on the time-frequency position.

In the embodiment described above, no pilot is configured on the physical resource transmitted on the second part of the PSCCH in the first time-frequency unit so as to improve the transmission resource of the second part, and further to improve the transmission performance of the second part.

Figure 5:
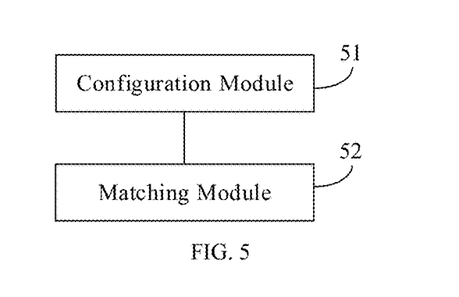
FIG. 5 is a block diagram illustrating an information configuration device according to one or more examples.

FIG. 5 is a block diagram illustrating an information configuration device located at the transmitting end according to an exemplary embodiment. As shown in FIG. 5, the information configuration device includes a configuration module 51 and a matching module 52.

The configuration module 51 is arranged to configure no pilot on a physical resource transmitted on a first time-frequency unit.

The time-frequency unit refers to a time domain unit and a frequency domain unit, and the time domain unit may include, but is not limited to, a time slot, a sub-frame, and the like.

The matching module 52 is arranged to: determine transmission capability of the physical resource, for which no pilot is configured by the configuration module 51, and perform rate matching based on the transmission capability.

After configuring no pilot on the physical resource transmitted on the first time-frequency unit, the transmission capability of the physical resource is determined, and rate matching is performed based on the transmission capability.

In the embodiment described above, no pilot is configured on the physical resource transmitted on the first time-frequency unit so as to improve the transmission resource of the physical resource, and further to improve the transmission performance of the physical resource.

Figure 6:
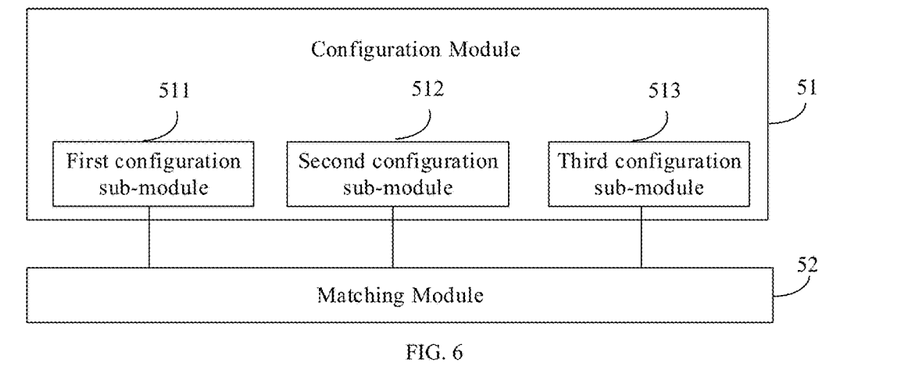
FIG. 6 is a block diagram illustrating another information configuration device according to one or more examples.

FIG. 6 is a block diagram illustrating another information configuration device according to an exemplary embodiment. As shown in FIG. 6, on the basis of the above embodiment shown in FIG. 5, the configuration module 51 may include a first configuration sub-module 511, a second configuration sub-module 512 or a third configuration sub-module 513.

The first configuration sub-module 511 is arranged to configure no pilot on a physical resource transmitted on a second part of a physical sidelink control channel (PSCCH) in the first time-frequency unit.

The second configuration sub-module 512 is arranged to configure no pilot on a physical resource transmitted on the PSCCH in the first time-frequency unit.

The third configuration sub-module 513 is arranged to configure no pilot on physical resources transmitted on the PSCCH and the physical sidelink shared channel (PSSCH) in the first time-frequency unit.

In the present embodiment, by configuring no pilot on the physical resource transmitted on the second part of the PSCCH, the transmission resource of the second part is enhanced, thereby improving the transmission performance of the second part.

Figure 7:
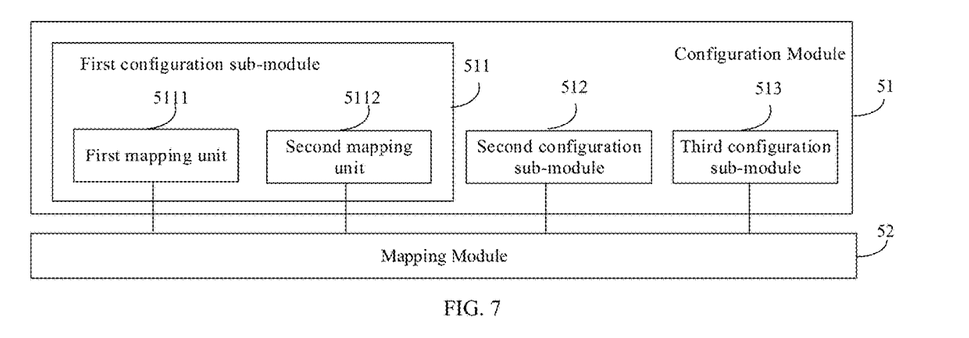
FIG. 7 is a block diagram illustrating another information configuration device according to one or more examples.

FIG. 7 is a block diagram illustrating another information configuration device according to an exemplary embodiment. As shown in FIG. 7, on the basis of the above embodiment shown in FIG. 6, the first configuration sub-module 511 may include a first mapping unit 5111 or a second mapping unit 5112.

The first mapping unit 5111 is arranged to: acquire time-frequency position of the physical resource transmitted on the second part of the PSCCH in the first time-frequency unit, and map the second part of the PSCCH at the time-frequency position.

The second mapping unit 5112 is arranged to map the second part of the PSCCH according to time-frequency position of a pilot of the PSSCH in the first time-frequency unit.

The second mapping unit 5112 can be arranged to:
map the second part of the PSCCH to a time-frequency unit within a preset range of the time-frequency unit where the pilot of the PSSCH is located; or
map the second part of the PSCCH such that a first pilot of the PSSCH is adjacent to the second part of the PSCCH in the time-frequency domain.

By configuring no pilot, through various mapping manners, on the physical resource transmitted on the second part of the PSCCH in the first time-frequency unit, the implementations of the embodiment described above are simple and diverse.

Figure 8:
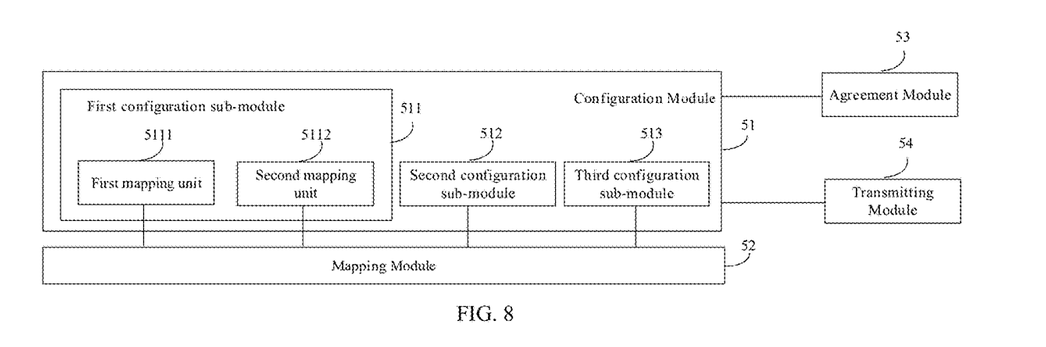
FIG. 8 is a block diagram illustrating another information configuration device according to one or more examples.

FIG. 8 is a block diagram illustrating another information configuration device according to an exemplary embodiment. As shown in FIG. 8, on the basis of the above embodiments shown in FIGS. 5 to 7, the device may further include an agreement module 53 or a transmitting module 54.

The agreement module 53 is arranged to agree on configuration information of a corresponding physical resource through protocols.

The transmitting module 54 is arranged to transmit configuration information of the corresponding physical resource to the receiving end.

In the above embodiment, the configuration information of the corresponding physical resource is agreed through the protocols, or the configuration information of the corresponding physical resource is transmitted to the receiving end, so that the receiving end can acquire the location of the second part of the PSCCH channel according to the configuration information.

Figure 9:
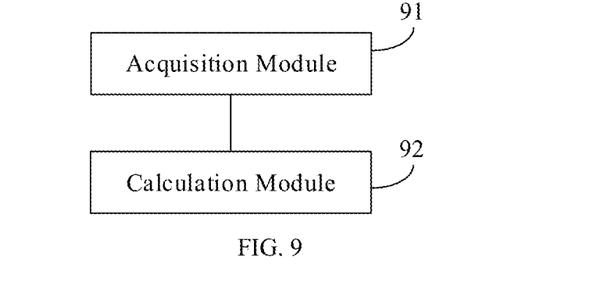
FIG. 9 is a block diagram illustrating a channel estimation device according to one or more examples.

FIG. 9 is a block diagram illustrating a channel estimation device located at a receiving end according to an exemplary embodiment. As shown in FIG. 9, the channel estimation device includes:

an acquisition module 91, arranged to acquire time-frequency position of a channel, for which no pilot is configured, in first time-frequency unit;

a calculation module 92, arranged to calculate, based on the time-frequency position obtained by the acquisition module 91, a channel estimation value for the channel.

Figure 10:
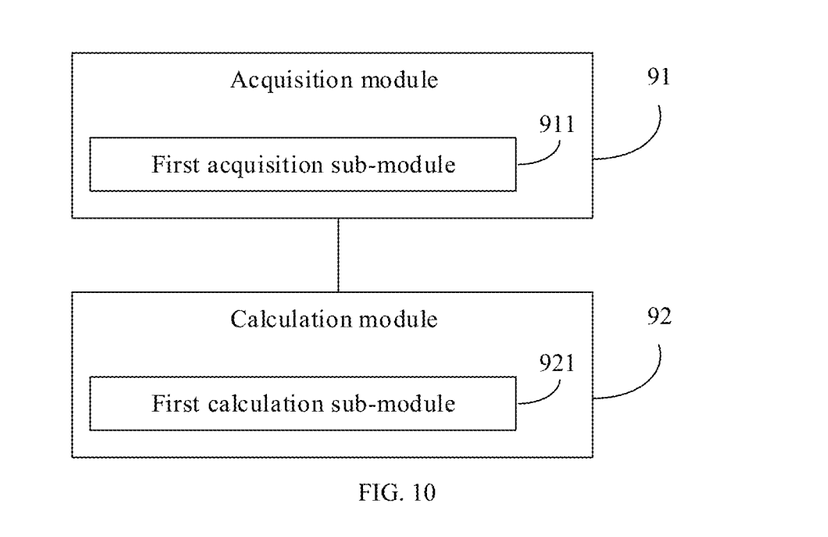
FIG. 10 is a block diagram illustrating another channel estimation device according to one or more examples.

FIG. 10 is a block diagram illustrating another channel estimation device according to an exemplary embodiment. As shown in FIG. 10, on the basis of the above embodiment shown in FIG. 9, the acquisition module 91 may include:

a first acquisition sub-module 911, arranged to acquire time-frequency position of a second part of the PSCCH.

The calculation module 92 may include:

a first calculation sub-module 921, arranged to calculate, based on the time-frequency position of the second part of the PSCCH acquired by the first acquisition sub-module, a channel estimation value for the second part of the PSCCH.

The first acquisition sub-module 911 is arranged to:

acquire, according to configuration information of a physical resource corresponding to the second part of the PSCCH or the position of the pilot of the PSSCH, the time-frequency position of the second part of the PSCCH.

By acquiring the time-frequency position of the second part of the PSCCH in the first time-frequency unit, and calculating the channel estimation value for the second part of the PSCCH based on the time-frequency position of the second part of the PSCCH, the embodiment described above is implemented in a simple manner.

Figure 11:
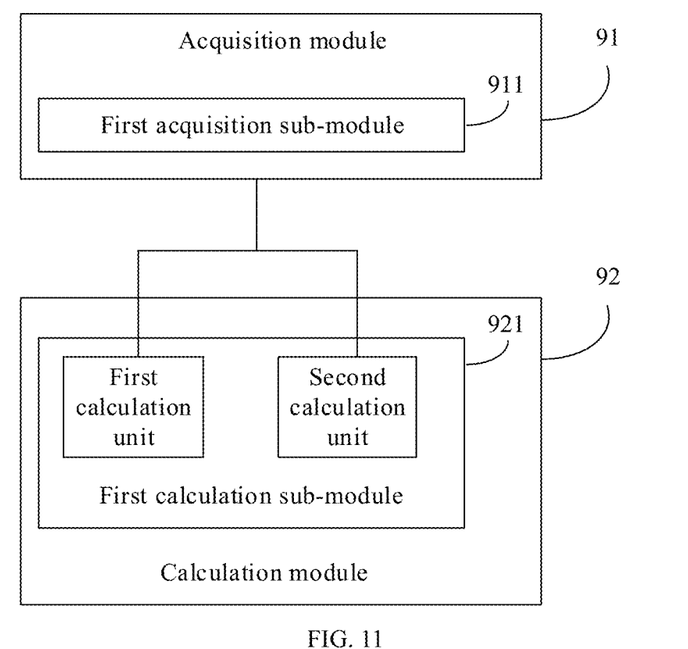
FIG. 11 is a block diagram illustrating another channel estimation device according to one or more examples.

FIG. 11 is a block diagram illustrating another channel estimation device according to an exemplary embodiment. As shown in FIG. 11, on the basis of the above embodiment shown in FIG. 10, the first calculation sub-module 921 may include a first calculation unit 9211 or a second calculation unit 9212.

The first calculation unit 9211 is arranged to calculate, based on the time-frequency position of the second part of the PSCCH and a pilot of the first part of the PSCCH, the channel estimation value for the second part of the PSCCH.

The second calculation unit 9212 is arranged to calculate, based on the time-frequency position of the second part of the PSCCH and a pilot of a traffic channel, the channel estimation value for the second part of the PSCCH.

In the embodiment described above, the channel estimation value for the second part of the PSCCH is calculated by using the pilot of the first part of the PSCCH or the pilot of the traffic channel, and the implementation manner is simple and diverse.

Figure 12:
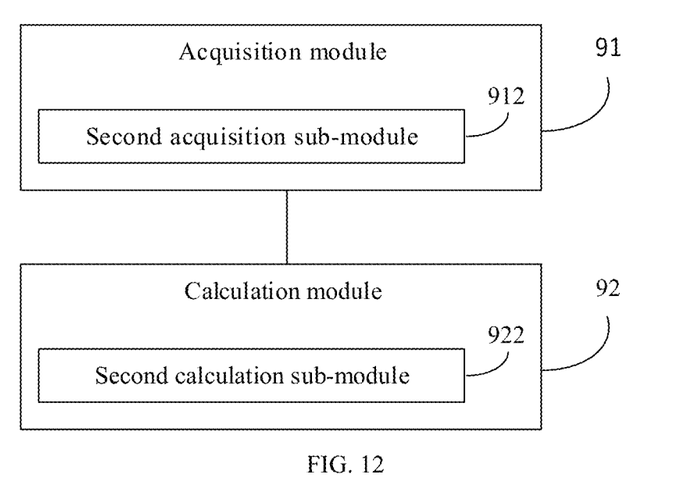
FIG. 12 is a block diagram illustrating another channel estimation device according to one or more examples.

FIG. 12 is a block diagram illustrating another channel estimation device according to an exemplary embodiment. As shown in FIG. 12, on the basis of the above embodiment shown in FIG. 9, the acquisition module 91 may include:

a second acquisition sub-module 912, arranged to acquire the time-frequency position of the PSCCH and the time-frequency position of the PSSCH in the first time-frequency unit.

The calculation module 92 may include:

a second calculation sub-module 922, arranged to calculate, according to the time-frequency position of the PSCCH and the time-frequency position of the PSSCH in the first time-frequency unit acquired by the second acquisition sub-module as well as a pilot of the previous time-frequency unit, the channel estimation value for the first time-frequency unit.

By acquiring the time-frequency position of the PSCCH in the first time-frequency unit and the time-frequency position of the PSSCH in the first time-frequency unit, and calculating, according to the time-frequency position of the PSCCH in the first time-frequency unit and the time-frequency position of the PSSCH in the first time-frequency unit as well as the pilot of the previous time-frequency unit, the channel estimation value for the first time-frequency unit, the embodiment described above is implemented in a simple manner.

Figure 13:
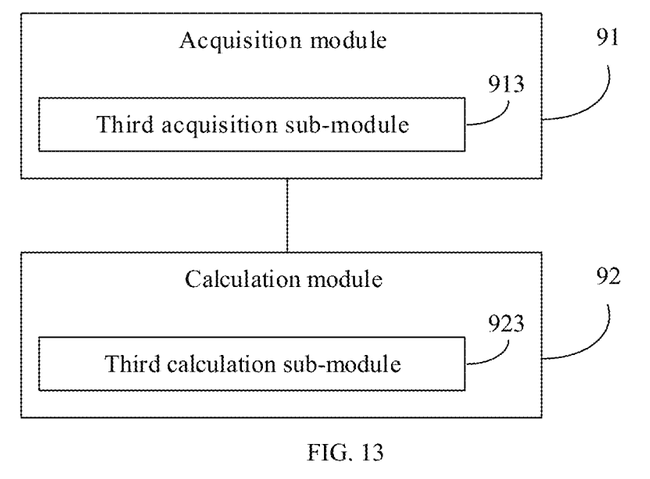
FIG. 13 is a block diagram illustrating another channel estimation device according to one or more examples.

FIG. 13 is a block diagram illustrating another channel estimation device according to an exemplary embodiment. As shown in FIG. 13, on the basis of the above embodiment shown in FIG. 9, the acquisition module 91 may include:

a third acquisition sub-module 913, arranged to acquire time-frequency positions of the first part and the second part of the PSCCH in the first time-frequency unit.

The calculation module 92 may include:

a third calculation sub-module 923, arranged to calculate, according to the time-frequency positions of the first part and the second part of the PSCCH in the first time-frequency unit acquired by the third acquisition sub-module as well as the pilot of the previous time-frequency unit, the channel estimation value for the first time-frequency unit.

By acquiring the time-frequency positions of the first part and the second part of the PSCCH in the first time-frequency unit, and calculating, according to the time-frequency positions of the first part and the second part of the PSCCH in the first time-frequency unit and the pilot of the previous time-frequency unit, the channel estimation value for the first time-frequency unit, the embodiment described above is implemented in a simple way.

Figure 14:
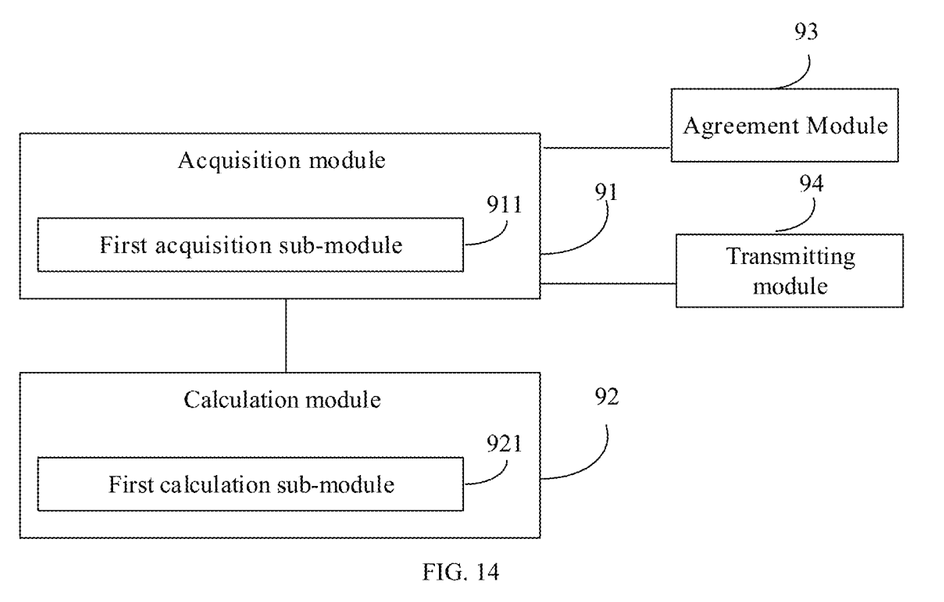
FIG. 14 is a block diagram illustrating another channel estimation device according to one or more examples.

FIG. 14 is a block diagram illustrating another channel estimation device according to an exemplary embodiment. As shown in FIG. 14, on the basis of the above embodiment shown in FIG. 10, the device further includes an agreement module 93 or a reception module 94.

The agreement module 93 is arranged to agree on configuration information of a corresponding physical resource through protocols.

The reception module 94 is arranged to receive the configuration information of the corresponding physical resource transmitted from the transmitting end.

By agreeing on the configuration information of the corresponding physical resource through the protocols, or receiving the configuration information of the corresponding physical resource transmitted from the transmitting end, the above embodiment can obtain the time-frequency position of the second part of the PSCCH according to the configuration information.

Figure 15:
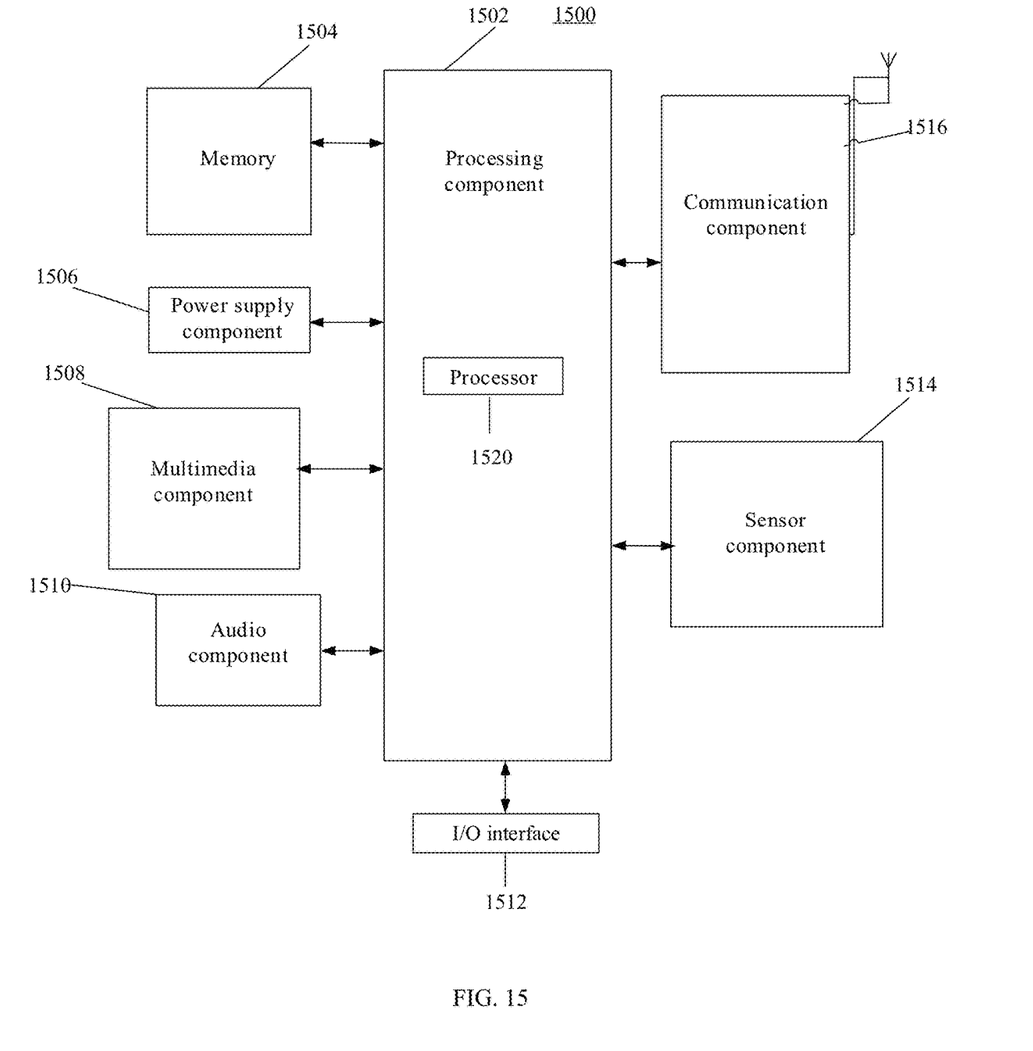
FIG. 15 is a block diagram illustrating a device suitable for information configuration or channel estimation according to one or more examples.

FIG. 15 is a block diagram illustrating a device suitable for information configuration or channel estimation according to an exemplary embodiment. For example, the device 1500 may be a mobile phone, computer, digital broadcast terminal, messaging device, game console, tablet device, medical device, fitness device, personal digital assistant and other user equipment.

Referring to FIG. 15, the device 1500 may include one or more of the following components: a processing component 1502, a memory 1504, a power supply component 1506, a multimedia component 1508, an audio component 1510, an input/output (I/O) interface 1512, a sensor component 1514, and a communication component 1516.

Generally, the processing component 1502 is arranged to control the overall operations of the device 1500, such as operations associated with displaying, telephone calls, data communications, camera operations, and recording operations. The processing component 1502 may include one or more processors 1520 to execute instructions to complete all or part of the steps in the foregoing method. In addition, the processing component 1502 may include one or more modules to facilitate the interaction between the processing component 1502 and other components. For example, the processing component 1502 may include a multimedia module to facilitate the interaction between the multimedia component 1508 and the processing component 1502.

When the device 1500 is an information configuration device, one of the processors 1520 among the processing component 1502 may be arranged to:

configure no pilot on the physical resource transmitted on the first time-frequency unit;

determine the transmission capability of the physical resource, for which no pilot is configured, and perform rate matching based on the transmission capability.

When the device 1500 is a channel estimation device, one of the processors 1520 among the processing component 1502 may be arranged to:

acquire time-frequency position of a channel, for which no pilot is configured, in first time-frequency unit;

calculate a channel estimation value for the channel based on the time-frequency position.

The memory 1504 is arranged to store various data to support operations of the device 1500. Examples of the data include instructions of any application or method that can be run on the device 1500, contact data, phonebook data, messages, pictures and videos and the like. The memory 1504 can be implemented by any type of volatile or non-volatile storage device or their combination, such as static random access memory (SRAM), electrically erasable programmable read-only memory (EEPROM), erasable and Programmable read-only memory (EPROM), programmable read-only memory (PROM), read-only memory (ROM), magnetic memory, flash memory, magnetic disk or optical disk.

The power supply component 1506 is arranged to supply power to various components of the device 1500. The power supply component 1506 may include a power management system, one or more power supplies, and other components associated with generating, managing, and distributing power for the device 1500.

The multimedia component 1508 includes a screen that provides an output interface between the device 1500 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touch, sliding, and gestures on the touch panel. The touch sensor may not only sense the boundary of the touch or slide action, but also detect the duration and pressure related to the touch or slide operation. In some embodiments, the multimedia component 1508 includes a front camera and/or a rear camera. When the device 1500 is in an operation mode, such as a shooting mode or a video mode, the front camera and/or the rear camera can receive external multimedia data. Each front camera and rear camera can be a fixed optical lens system or have focal length and optical zoom capabilities.

The audio component 1510 is arranged to output and/or input audio signals. For example, the audio component 1510 includes a microphone (MIC), and when the device 1500 is in an operation mode, such as a call mode, a recording mode, and a voice recognition mode, the microphone is arranged to receive external audio signals. The received audio signal may be further stored in the memory 1504 or transmitted via the communication component 1516. In some embodiments, the audio component 1510 further includes a speaker for outputting audio signals.

The I/O interface 1512 provides an interface between the processing component 1502 and a peripheral interface module. The peripheral interface module may be a keyboard, a click wheel, a button, and the like. The button includes but not limits to a home button, a volume button, a start button and a lock button.

The sensor component 1514 includes one or more sensors for providing the device 1500 with state evaluation in various aspects. For example, the sensor component 1514 can detect the on/off state of the device 1500 and the relative positioning of the components. For example, the component is the display and the keypad of the device 1500. The sensor component 1514 can also detect the position change of the device 1500 or a component of the device 1500, the presence or absence of contact between the user and the device 1500, the orientation or acceleration/deceleration of the device 1500, and the temperature change of the device 1500. The sensor component 1514 may include a proximity sensor arranged to detect the presence of nearby objects without physical contact. The sensor component 1514 may also include a light sensor used for imaging application, such as a complementary metal oxide semiconductor (CMOS) or a charge coupled device (CCD) image sensor. In some embodiments, the sensor component 1514 may also include an acceleration sensor, a gyroscope sensor, a magnetic sensor, a pressure sensor or a temperature sensor.

The communication component 1516 is arranged to facilitate wired or wireless communication between the communication device 1500 and other devices. The communication device 1500 can access a wireless network based on a communication standard, such as Wi-Fi, 2G, or 3G, or a combination thereof. In an exemplary embodiment, the communication component 1516 receives a broadcast signal or broadcast related information from an external broadcast management system via a broadcast channel. In an exemplary embodiment, the communication component 1516 further includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an exemplary embodiment, the device 1500 may be implemented by one or more application specific integrated circuits (ASIC), digital signal processors (DSP), digital signal processing devices (DSPD), programmable logic devices (PLD), field programmable gate array (FPGA), a controller, a microcontroller, a microprocessor, or other electronic components, to execute the foregoing method.

In an exemplary embodiment, there is further provided a non-transitory computer-readable storage medium including instructions, such as a memory 1504 including instructions, which may be executed by the processor 1520 of the device 1500 to complete the foregoing method. For example, the non-transitory computer-readable storage medium may be a ROM, a random access memory (RAM), a CD-ROM, a magnetic tape, a floppy disk, an optical data storage device, etc.

The device embodiments are basically correspond to the method embodiments, thus reference may be made to descriptions of the method embodiments for related parts. The device embodiments described above are only illustrative, where the units described as separate components may or may not be physically separated, and the components shown as units may or may not be physical units, that is, they may be located in one place, or distributed to multiple network elements. Some or all of the modules may be selected according to actual needs to achieve the purpose of the solution in the embodiment. Those of ordinary skill in the art can understand and implement it without paying creative effort.

It should be noted that, in the present disclosure, relationship terms such as first and second are only used to distinguish one entity or operation from another entity or operation, and do not necessarily require or imply any such actual relationship or sequence exists between these entities or operations. The terms "comprising", "including" or any other variation thereof are intended to encompass non-exclusive inclusion such that a process, method, article or device including a list of elements includes not only those elements, but also other not expressly listed elements, or also include elements inherent to such a process, method, article or apparatus. Without further limitation, an element qualified by the phrase "comprising a . . . " does not preclude the presence of additional identical elements in a process, method, article or apparatus that includes the element.

Other embodiments of the present disclosure will be apparent to those skilled in the art from consideration of the specification and practice of the present disclosure disclosed herein. The present application is intended to cover any variations, uses, or adaptations of the present disclosure, which are in accordance with the general principles of the present disclosure and include common general knowledge or conventional technical means in the art that are not disclosed in the present disclosure. The specification and embodiments are illustrative, and the real scope and spirit of the present disclosure is defined by the appended claims.

It should be understood that the present disclosure is not limited to the precise structures that have been described above and shown in the drawings, and various modifications and changes can be made without departing from the scope thereof. The scope of the present disclosure is merely defined by the appended claims.

What is claimed is:

1. An information configuration method, comprising:
   configuring, by a transmitter, no pilot on a physical resource transmitted on a first time-frequency unit; and
   determining, by the transmitter, a transmission capability of the physical resource for which no pilot is configured, and performing rate matching based on the transmission capability,
   wherein configuring no pilot on a physical resource transmitted on a first time-frequency unit, comprising:
   configuring no pilot on a physical resource transmitted on a second part of a physical sidelink control channel (PSCCH) in the first time-frequency unit;
   configuring no pilot on a physical resource transmitted on the PSCCH in the first time-frequency unit; or
   configuring no pilot on physical resources transmitted on the PSCCH and a Physical SideLink Shared Channel (PSSCH) in the first time-frequency unit.

2. The method according to claim 1, wherein configuring no pilot on the physical resource transmitted on the second part of the PSCCH in the first time-frequency unit, comprising:
   acquiring time-frequency position of the physical resource transmitted on the second part of the PSCCH in the first time-frequency unit, and mapping the second part of the PSCCH at the time-frequency position; or
   mapping the second part of the PSCCH according to time-frequency position of a pilot of the PSSCH in the first time-frequency unit.

3. The method according to claim 2, wherein mapping the second part of the PSCCH according to the time-frequency position of the pilot of the PSSCH in the first time-frequency unit, comprising:
   mapping the second part of the PSCCH to a time-frequency unit within a preset range of a time-frequency unit where the pilot of the PSSCH is located; or
   mapping the second part of the PSCCH such that a first pilot of the PSSCH is adjacent to the second part of the PSCCH in the time-frequency domain.

4. The method according to claim 1, further comprising:
   agreeing on configuration information of a corresponding physical resource through protocols; or
   transmitting configuration information of a corresponding physical resource to a receiver.

5. A channel estimation method, comprising:
   acquiring, by a receiver, time-frequency position of a channel, for which no pilot is configured, in a first time-frequency unit; and
   calculating, by the receiver, based on the time-frequency position, a channel estimation value for the channel,
   wherein acquiring the time-frequency position of the channel, for which no pilot is configured, in the first time-frequency unit, comprising:
   acquiring time-frequency position of a second part of a physical sidelink control channel (PSCCH); and
   wherein calculating, based on the time-frequency position, the channel estimation value for the channel, comprising:
   calculating, based on the time-frequency position of the second part of the PSCCH, a channel estimation value for the second part of the PSCCH.

6. The method according to claim 5, wherein calculating, based on the time-frequency position of the second part of the PSCCH, the channel estimation value for the second part of the PSCCH, comprising:
   calculating, based on the time-frequency position of the second part of the PSCCH and a pilot of a first part of the PSCCH, the channel estimation value for the second part of the PSCCH; or
   calculating, based on the time-frequency position of the second part of the PSCCH and a pilot of a traffic channel, the channel estimation value for the second part of the PSCCH.

7. The method according to claim 5, wherein acquiring the time-frequency position of the channel, for which no pilot is configured, in the first time-frequency unit, comprising:
   acquiring time-frequency position of a physical sidelink control channel (PSCCH) in the first time-frequency unit and time-frequency position of a physical sidelink shared channel (PSSCH) in the first time-frequency unit;
   the calculating, based on the time-frequency position, the channel estimation value for the channel, comprising:
   calculating, according to the time-frequency position of the PSCCH and the time-frequency position of the PSSCH in the first time-frequency unit as well as a pilot of a previous time-frequency unit, the channel estimation value for the first time-frequency unit.

8. The method according to claim 5, wherein acquiring the time-frequency position of the channel, for which no pilot is configured, in the first time-frequency unit, comprising:
acquiring time-frequency positions of a first part and a second part of a physical sidelink control channel (PSCCH) in the first time-frequency unit;
the calculating, based on the time-frequency position, the channel estimation value for the channel, comprising:
calculating, according to the time-frequency positions of the first part and the second part of the PSCCH in the first time-frequency unit and a pilot of a previous time-frequency unit, the channel estimation value for the first time-frequency unit.

9. The method according to claim 5, wherein acquiring the time-frequency position of the second part of the PSCCH, comprising:
acquiring, according to configuration information of a physical resource corresponding to the second part of the PSCCH or a position of a pilot of the PSSCH, the time-frequency position of the second part of the PSCCH.

10. The method according to claim 9, further comprising:
agreeing on configuration information of a corresponding physical resource through protocols; or
receiving configuration information of a corresponding physical resource from a transmitter.

11. An information configuration device, comprising:
a processor; and
a memory for storing instructions executable by the processor;
wherein the processor is arranged to execute operation of:
configuring no pilot on a physical resource transmitted on a first time-frequency unit; and
determining a transmission capability of the physical resource for which no pilot is configured, and performing rate matching based on the transmission capability,
wherein configuring no pilot on a physical resource transmitted on a first time-frequency unit, comprising:
configuring no pilot on a physical resource transmitted on a second part of a physical sidelink control channel (PSCCH) in the first time-frequency unit;
configuring no pilot on a physical resource transmitted on the PSCCH in the first time-frequency unit; or
configuring no pilot on physical resources transmitted on the PSCCH and a Physical SideLink Shared Channel (PSSCH) in the first time-frequency unit.

12. A channel estimation device, comprising:
a processor; and
a memory for storing instructions that, when executed by the processor, cause the processor to execute the method according to claim 5.

13. The information configuration device according to claim 11, wherein the configuring no pilot on the physical resource transmitted on the second part of the PSCCH in the first time-frequency unit, comprising:
acquiring time-frequency position of the physical resource transmitted on the second part of the PSCCH in the first time-frequency unit, and mapping the second part of the PSCCH at the time-frequency position; or
mapping the second part of the PSCCH according to time-frequency position of a pilot of the PSSCH in the first time-frequency unit.

14. The information configuration device according to claim 13, wherein the mapping the second part of the PSCCH according to the time-frequency position of the pilot of the PSSCH in the first time-frequency unit, comprising:
mapping the second part of the PSCCH to a time-frequency unit within a preset range of a time-frequency unit where the pilot of the PSSCH is located; or
mapping the second part of the PSCCH such that a first pilot of the PSSCH is adjacent to the second part of the PSCCH in the time-frequency domain.

15. The information configuration device according to claim 11, wherein the processor is further arranged to execute operation of:
agreeing on configuration information of a corresponding physical resource through protocols; or
transmitting configuration information of a corresponding physical resource to a receiver.

16. A non-transitory computer-readable storage medium having a computer program stored thereon, wherein the program, when executed by a processor, is used to implement the steps in the information configuration method according to claim 1.

17. A non-transitory computer-readable storage medium having a computer program stored thereon, wherein the program, when executed by a processor, is used to implement the steps in the channel estimation method according to claim 5.

* * * * *